(12) United States Patent
Haines et al.

(10) Patent No.: US 8,323,800 B2
(45) Date of Patent: Dec. 4, 2012

(54) METHOD OF BONDING TO GOLD SURFACE AND RESULTANT COMBINATIONS

(75) Inventors: Daniel Haines, Lake Ariel, PA (US); David Yuhas, Clarks-Summit, PA (US); Eric Urruti, Duryea, PA (US)

(73) Assignee: Schott Corporation, Elmsford, NY (US)

( * ) Notice: Subject to any disclaimer, the term of this patent is extended or adjusted under 35 U.S.C. 154(b) by 581 days.

(21) Appl. No.: 12/481,291

(22) Filed: Jun. 9, 2009

(65) Prior Publication Data

US 2010/0310888 A1    Dec. 9, 2010

(51) Int. Cl.
*B32B 15/08* (2006.01)
*B32B 17/06* (2006.01)
*B32B 37/02* (2006.01)

(52) U.S. Cl. ........ 428/429; 156/325; 156/326; 156/329; 428/450

(58) Field of Classification Search ............ 156/325, 156/326, 329; 428/429, 450
See application file for complete search history.

(56) References Cited

U.S. PATENT DOCUMENTS 4,315,970 A * 2/1982 McGee ................ 428/412

OTHER PUBLICATIONS

Matsuda A et al *J. Am. Ceram. Soc.* 84 (2001) 775-780.
Schmidt H. *Journal of Sol-Gel Science and Technology*, 2000 (19), 39-51.
Jitianu A. et al. *J. Mater. Res.* 2008, 23, 2084-2090.
Matsuda A et al. *J Am Ceram Soc* 1998 (81) 2489.
Klein et al. *J Am Cer Soc* 2009 (92) 36-40.
Klein and Jitianu .*SEHB* Oct. 2008 pp. 2171-2182 Methyl-modified Melting Gels for Hermetic Barrier Coatings.

* cited by examiner

*Primary Examiner* — D. S. Nakarani
(74) *Attorney, Agent, or Firm* — Miller, White, Zelano, Branigan, P.C.

(57) ABSTRACT

The present invention relates to a method of bonding a gold surface to a second surface which comprises heating a hybrid organic-inorganic melting gel >50° C., applying the melting gel to either the gold surface or the second surface. The melting gel is heated to above 130° C. until the melting gel has cured sufficiently to bond the surfaces together. The invention also relates to a combination of a gold surface and a second surface that is bonded together with a hybrid organic-inorganic melting gel. In another aspect of the invention the hybrid organic-inorganic melting gel is heated to a workable viscosity and cast into a film, sheet, block or lens. The cast gel is cured or partially cured and then applied between the gold surface and the second surface. Additional uncured melting gel may be applied. The construct is heated to above 130° C. until the melting gel has cured sufficient to bond the surfaces together.

20 Claims, No Drawings

METHOD OF BONDING TO GOLD SURFACE AND RESULTANT COMBINATIONS

BACKGROUND OF THE INVENTION

Gold and gold-coated substrates are typically bonded to itself or other materials utilizing thermocompression bonding, eutectic bonding, and epoxy bonding. Thermocompression bonding requires the use of moderate temperatures (>250° C.) and pressure (>1 MPa) to bond gold-to-gold. Eutectic bonding uses a metal amalgam to bond gold to another surface (i.e. Au/Sn). Epoxy bonding uses an organic epoxy based adhesive with various additives (adhesion promoter, filler, conductive materials) to bond gold to various substances (i.e. TRA-BOND 868-6N3, ABLEBOND 789-3).

Bonding a variety of materials (e.g., glasses, glass ceramics, single crystals, and polycrystalline materials) to a gold or gold-coated surface with a bonding agent that is durable, versatile, well-adhered, and optically transparent is a very difficult task. Gold and gold-coated substrates are difficult to bond due to the chemical inertness of the gold surface and limited means to form bonds to the surface. See, for example, Cotton, F. A., Wilkinson, G. Advanced Inorganic Chemistry $5^{th}$ Edition, 1988 John Wiley & Sons, New York pg. 939. Numerous organic agents (epoxy-and organo-silanes) have been utilized to bond a variety of materials with optical transparency; however, this results in bonded materials that are temperature limited due to the adhesive working temperatures (typically <200° C.) and may significantly outgas under vacuum conditions. One common problem with organic bonding agents is a bond that can be hydrated, swell, and delaminate upon exposure to water and/or other chemical agents. For example, U.S. Pat. No. 7,053,521 states that a gold surface is very difficult to bond to and discloses a method for laminating gold surfaces by adding a thiol containing organosilane to a bisphenol-A epoxy adhesive for better adhesion. Few chemical species can bond to gold, and even those that do, for example alkanethiols, only form uniform films to gold surfaces through dative bonds, but do not have the requisite strength and stability to function as an adhesive. Traditional organic bonding materials are suitable for use on both optically and non-optically flat surfaces; however, they often have limited shelf-life, and/or limited pot life, and may require mixing prior to dispensing due to the reactivity of the components of the adhesive. For example, TRA-BOND 868-6N3™, an epoxy for bonding of gold and various metals, has a pot life of 15 minutes, shelf-life of 3 months at −40° C. storage, and operating temperature up to 115° C.

Inorganic bonding agents have been used to bond glasses and glass ceramics; however, this usually requires a precision optical finish in order to produce defect free bonds with a thickness of ~2 microns. Inorganic bonding methods that can be performed at low temperatures (<350° C.) typically require optically flat surfaces to produce transparent bonds and specific surface chemistries. For example, U.S. Pat. No. 6,284,085, which discloses a hydroxide containing bonding solution for bonding various materials together, is limited to materials having oxide surfaces.

Thus, there is a need in the art for a gold bonding procedure without the constraints of the prior art gold bonding materials and methods.

SUMMARY OF THE INVENTION

The present inventors have found that hybrid organic-inorganic melting gels can be used to bond gold-coated components to various surfaces. The resulting bond is strong and the cured gel is an optically transparent material that does not crack upon drying. A hybrid organic-inorganic melting gel has a long shelf-life (>1 year at room temperature) and a long and reversible pot-life. The pot-life is equivalent to the shelf-life for melting gel adhesives since no additional catalyst is required to add to the adhesive prior to bonding. A reversible pot life is defined as being able to bring the adhesive up to the bonding temperature and back down to storage temperature repeatedly [i.e. >20 times] without significant change in adhesive properties. The bonding technique does not require optically flat surfaces (i.e. optically flat is defined as ≦50 nm roughness) to produce strong bonds and represents a novel approach to gold bonding.

It is also advantageous that the hybrid organic-inorganic melting gel material can have its optical and physical properties modified (e.g., refractive index, density, Young's Modulus, hardness, viscosity, density). This can be accomplished in a variety of ways, for example, by changing the ligand set of the starting precursors, adjusting the process parameters, and adding catalyst's to affect the rate of reaction. The compositional modification of the hybrid organic-inorganic hybrid material results in a material that is resistant to high temperatures. Because the material is moderately gap filling, optically flat surfaces are not required to achieve a strong bond. Thin bond joints compared to some organic methods minimize the impact of the bond material on the overall CTE of components.

The process of the present invention utilizes hybrid organic-inorganic melting gels to bond gold or gold-coated substrates to various surfaces. For example, the hybrid organic-inorganic melting gels can bond gold-to-gold, gold-to-glass, gold-to-fused silica, and gold-to-glass ceramics. The melting gels can be applied without an inert gas or vacuum, do not require an adhesion promoter, and have low coefficient's of thermal expansion (CTE). In a preferred embodiment the CTE of the cured melting gel is 0.7 ppm from 30-300° C. The melting gels differ chemically from currently used epoxy adhesives. Standard epoxy based adhesives contain bisphenol backbones and bond using their epoxide groups. A further advantage of the melting gel adhesives is that they can be "cut" and reworked using acetone to adjust viscosity effectively extending the pot life.

Thus, the present invention relates to combinations comprising a gold or gold-coated surface bonded to a second surface with a hybrid organic-inorganic melting gel. The present invention also relates to a method of bonding a gold-coated surface to a second surface. A hybrid organic-inorganic melting gel, which is very viscous at room temperature, is heated until the viscosity decreases to a workable range dependent on the method of application. The workable melting gel is then applied to the gold or gold-coated surface and/or said second surface. The two surfaces are brought together and the melting gel is heated to above 130° C. until the melting gel has cured thereby bonding the gold or gold-coated surface and said second surface. Alternatively, the heated hybrid organic-inorganic melting gel can be cast as a film, sheet, block, lense, etc. and cured prior to applying to the gold or gold-coated surface and/or said second surface along with a small amount of workable viscosity uncured melting gel. Alternatively, the heated hybrid organic-inorganic melting gel can be cast as a film, sheet, block, lense, etc., partially cured, and applied to the gold or gold-coated surface and/or said second surface with or without the addition of a small amount of workable viscosity uncured melting gel. In another aspect of the invention, a hybrid organic-inorganic melting gel is heated to >50° C. and an acid catalyst is added. The melting gel is applied to either the gold surface or the second surface and the surfaces are brought together. The melting gel is then heated to above 60° C. until the melting gel has cured sufficiently to bond the gold surface and said second surface together.

The preferred limit for a substrate or surface that can act as the second surface is its temperature compatibility to the process conditions, having a coefficient of thermal expansion difference compared to the first surface or first substrate of 0-15 ppm/° C. Furthermore, the compatibility of the second surface can be distinguished by the roughness of its surface. Preferably, surfaces with gaps up to 20 μm. can be bonded together. More preferably, surfaces with gaps up to 10 μm can be bonded together. Most preferably, surfaces with gaps up to 5 μm can be bonded together. The most preferred surface is a Borofloat™ glass or a gold-coated Borofloat™ glass. Other preferred surfaces or gold-coated surfaces include, for example, alkali containing float glass such as a borosilicate-glass (e.g. Borofloat 33, Borofloat 40, Duran, of SCHOTT AG, Mainz), soda lime silicate glass, multi-component oxide silicate glass, synthetic fused silica, alkaline free glass (e.g. AF37 or AF45 of SCHOTT AG, Mainz), alumosilicate-glasses (e.g. Fiolax, lllax, of Schott Mainz), alkaline earth alkaline glasses (e.g. B270, BK7 of SCHOTT AG, Mainz), a glass ceramic such as Ceran™, Robax™, Zerodur™ of SCHOTT, a display glass such as D263™ of SCHOTT-DE-SAG, a borosilicate crown glass such as BK7™ of SCHOTT, rare earth doped IOG1 phosphate glass of Schott USA, a fluorozirconate glass such as Zblan™, Schott solarglass, 0213 and 0214 coverglass of CORNING, germanium, a magnesium aluminosilcate glass-ceramic, mica, stainless steel, a low expansion glass ceramic such as Neoceram™, a modified borosilicate glass such as AF45™, P-LASF-7™ glass, O'Hara glasses such as PBH56™ &STIM26™, PSF8™ glass or SF57HHT™ glass from SCHOTT, etc.

Suitable surfaces can be, for example, flat glass, glass tube, glass lenses, prisms, ampoules, karpulles, bottles, cans, fiber optic bundles, and other shaped glass parts. Further surfaces can be glass ceramics in flat or curved form or glass tubes. All suitable surfaces may also be gold-coated.

The above-mentioned surfaces can be bonded to gold or gold-coated surfaces. The process of depositing or coating a surface with a gold coating is well known to one skilled in the art. There are numerous sources of commercially available gold-coated surfaces of various gold thickness and configurations. Platypus Technologies offers aluminosilicate glass slides, cover slips, mica and silica wafers covered with form 100-1000 A of Au over a titanium adhesion layer. Gold-coated soda-lime glass microscope slides with a titanium adhesion layer are available from Sigma-Aldrich. Nanocs provides several types of nanometer gold-coated glass, or mica slides. Patterned gold-coated glass and mica slides are available for Asylum Research. Gold coatings can be conveniently deposited on a variety of substrates through sputtering methods and are commercially available from various companies such as Edmund Optics.

The bonding method of the present invention applies to any suitable gold or gold-coated surface. Gold-coated borofloat, Zerodur™, fused silica, sodalime, D263 T Borosilicate glass from SCHOTT, a borosilicate crown glass from Schott such as BK-7™, an Er/Yb-codoped glass such as IOG1™ phosphate glass from Schott, a heavy-metal fluoride glass such as Zblan™, Schott solarglass, ceria-doped borosilicate glass such as corning coverglass 0213 and 0214, germanium, and Robax™ are the most preferred gold-coated surfaces.

In general "gold" in the context of this invention includes gold per se and/or gold coatings of a purity of 1 to 24 carat, preferably >12 carat.

Depending on sample quality, surfaces may be cleaned before bonding is carried out. Typical chemical cleaning of surfaces involves cleaning techniques such as acids, bases and plasma to remove any particulates and both inorganic and organic residues. Typical physical cleaning methods include wiping, spraying, brushing, blowing, dipping, and spinning. Combinations of physical and chemical cleaning methods are often employed when cleaning substrates prior to bonding, depending on the end application, cleanliness of surface (amount of gross particulates), and contamination of the surface (i.e. adventitious carbon adsorption). Cleaning and bonding of the surfaces are performed from conditions ranging from typical benchtop environment in a laboratory, inside a convection oven, to clean room environments, depending on the end application for the bonded surfaces.

"Hybrid organic-inorganic melting gels" (i.e., melting gels) are organically modified silica gels prepared by a sol gel process. The gels have glass transition temperatures ($T_g$) typically <50° C. and are quite viscous at room temperature but have workable viscosities around 50°C.-110° C., making pouring and application easy. Softening can be repeated numerous times without significant curing of the melting gel, allowing for a long pot life. However, once the melting gels reach a temperature of around 130°-150° C. they begin to consolidate (crosslink, i.e., cure). In most applications, after 12-24 hours of curing 140° C. they become rigid and are prevented from further softening. Melting gels do not darken upon consolidation, which is advantageous particularly for optical applications. Melting gel preparation is well known to one skilled in the art and is described, for example, in J. Am. Ceram. Soc. 84 (2001) 775-780; J. Am. Ceram Soc. 92(1) 36-40 (2009); Journal of Sol-Gel Science and Technology, 2000 (19), 39-51 and J. Material Research 2008(23), 2084-2090, the compositions and processing details of which are incorporated herein by reference.

In general, preparation of melting gels involves standard sol-gel precursor materials, such as silicon alkoxides (functionalized alkoxysilanes), solvents (ethanol), water, catalyst (acid and/or base). In a preferred embodiment, methyltriethoxysilane (MTES) and dimethyldiethoxysilane (DMDES) are the silicon alkoxide precursors. The melting gels exhibit thermoplastic behavior below their curing temperature, having optical properties similar to inorganic materials once cured, while having the benefit of low processing temperatures to prepare the cured adhesive similar to organic materials. The MTES/DMES material is a viscous gel at room temperature; however, it has reduced viscosity (i.e. workable viscosity) at around 50-110° C. and flows readily. This viscous gel to workable liquid transition can be repeated numerous times without deleterious effect, similar to a thermoplastic polymer as long as the temperature is kept below the curing temperature (i.e. consolidation temperature).

Melting gels are typically prepared from 1 or more organoalkoxysilane precursors of the general formula, $R^1{}_n$—Si$(OR^2)_{4-n}$, where n=0, 1, 2 or 3, $R^1$ is ethyl, methyl n-propyl, isopropyl, n-butyl, t-butyl, n-hexyl, n-heptyl, n-octyl, isooctyl, benzyl, trimethylsilylmethyl, n-decyl, octadecyl, methylheptacosane, methyltricosane, cyclohexyl, dodecyl, n-hexadecyl, eicosyl, docosyl, cyclopentyl, tolyl, and/or phenyl, among others, and $R^2$ is methyl, ethyl, propyl. For n=2 or 3 $R^1$ can be the same or different group. Preferred precursors include methyltriethoxysilane (MTES) ($CH_3$—Si—$(OEt)_3$) and dimethyldiethoxysilane (DMDES) (($CH_3)_2$—Si—$(OEt)_2$).

Various techniques have been used in the art to deposit sol-gel or "melting gel" compositions. For instance, various techniques have been used to deposit coating solutions while investigating film properties. Jitianu A. et al. *J. Mater. Res.* 2008, 23, 2084-2090,deposited sol-gel compositions by dip-coating to generate films for a humidity barrier on Surlyn. Matsuda A et al. *J Am Ceram Soc* 1998 (81) 2489, deposited melting gel compositions by spinning to generate films for optical data storage on a chemically strengthened glass disk. Klein et al. *J Am Cer Soc* 2009 (92) 36-40, deposited melting gel compositions by pouring to generate films on polycarbonate to determine film roughness and consolidation temperature as a function of the sol-gel compositions. The sol-gel deposition techniques described by Jitianu, Klien and Matsuda may also be used to deposit the melting gels bonding agents on the various surfaces to be bonded for this invention.

Deposition of the melting gel bonding agent onto the second surface or the gold or gold-coated surface may also be accomplished through a variety of conventional techniques such as brushing, dip-coating, spraying, spinning, casting, printing, pouring, or pipetting. Any technique that can deposit a liquid directly to the surface in principle can be used. Once the melting gel bonding agent is deposited, a fixturing device or jig may be used to keep the surfaces aligned and to apply pressure at specific locations across the surfaces to be bonded. For certain applications the masses of the surfaces themselves are sufficient for the development of a good bond; thus, only an alignment tool or jig may be required.

The deposition temperature will, of course, be dependent on the specific melting gel bonding agent chosen and the desired viscosity, all routinely determinable. Generally, deposition of the melting gel adhesive is conducted between 15-140° C., preferably between 15-115° C., and most preferably between 50-100° C.

It is also possible to add an adhesion promoter such as, for example, a hydroxide capped alkanethiol or a 3-mercaptopropyltrimethoxysilane, where desired.

Generally, the curing temperature of the melting gel bonding agent is between 50-200° C., preferably between 70-160° C., and most preferably between 80-150° C. The curing time of the melting gel bonding agent will depend on the particular melting gel chosen, the mass of the surfaces and the amount of melting gel applied. Generally, the curing time of the melting gel bonding agent is about 5-1440 minutes, preferably about 60-1440 minutes, and most preferably about 360-1440 minutes. Longer curing time of the melting gel bonding agent may be required for full bond cure dependent on the size and heat capacity of the surfaces being bonded. The time between application and alignment of the surface will in general not be critical in differences in temperature. Curing time and/or temperature for the adhesive may be reduced by the addition of a catalyst such as an acid (i.e. HCl, acetic acid, etc.) or a base (i.e. $NH_4OH$).

The amount of melting gel applied to the surfaces will depend on the desired thickness of the bond and the size of the surface area covered. One skilled in the art can easily determine the amount of melting gel appropriate to achieve the desired bonding. Typical bond thicknesses are 0.1 to 10 microns. Typical thickness of cast melting gels to be applied to surfaces are 5-1000 microns.

Although the present embodiment has been described as a bonding agent for bonding two surfaces together it may also be used to coat a single gold or gold-coated surface. The bonding process may also be use to bond multi-layered structures together. It may also be used to bond on three-dimensional, non-planar surfaces.

Additionally, although the present embodiment has been described as a bonding agent for bonding two surfaces together and for coating a gold or gold-coated surface, the adhesive may also be cast or formed into various shapes (i.e. lenses, films, sheets), partially or fully cured, and then used with additional adhesive for bonding or coating the cast adhesive to a gold, gold-coated, or non-gold-coated surface. Methods of casting are conventional. Cast melting gels suitable for use in the present invention are from 5-100,000 microns thick, preferably from 5-10,000 microns and most preferably from about 5-1,000 microns.

As a result of the unique characteristics of hybrid organic-inorganic melting gels, areas of application for the process of the present invention include wafer level packaging, microelectricalmechanical systems (MEMS), photolithography, circuit board assembly, electronic chip assembly, optical component bonding (prisms, laser optics), device component bonding (filter glass) and the like.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

EXAMPLE 1

| Preparation of Melting Gel | |
|---|---|
| | Duration |
| (1) Mix solutions as follows to make solution 1: | |
| Solution A: | Mix for 15 min |
| 8.1 ml $H_2O$ | |
| 0.1474 g HCl (37.1%) | |
| 13.8428 g EtOH | |
| Solution B: | Mix for 15 min |
| 27.0454 g MTES | |
| 13.799 g EtOH | |
| (2) Add solution B slowly to solution A under constant magnetic stirring Cover with parafilm and stir for 3 hours | |
| (3) After 2:45 minutes, make solution C | |
| Solution C: | Mix for 15 min |
| 7.6432 g DMDES | |
| 9.2114 g EtOH | |
| (4) Add Solution C to Solution A + B drop wise Cover with parafilm and stir for 2 hours | |
| (5) Add to resultant soution 278 ul $NH_4OH$ (30%) Cover with parafilm and stir for 1 hour | |
| (6) Remove parafilm and continue mixing | Mix for 48 hours |
| (7) Dry overnight at 70 C. to remove alcohol | Overnight |
| (8) Add: 10 ml of acetone | Mix for 2 hours |
| (9) Filter using a Buchner funnel with glass filters | |
| (10) Stir filtered product | Stir for 5-7 hours |
| (11) Heat at 70° C. to remove volatiles | 24 hours |
| (12) Heat at 110° C. for 24 hours to remove water | 24 hours |

EXAMPLE 2

Bonding Procedure Protocol:
(1) Heat all components (e.g., bonding jigs, melting gel, gold surface, second surface and dispensing tools) to around 80-110° C. in order to thermally equilibrate.
(2) Deposit a suitable amount of hybrid melting gel bonding agent to one face of one surface at a temperature of around 80-110° C.
(3) Bond the two surfaces together by clamping or fixing together at a temperature of around 80-110° C.

(4) Increase the temperature and cure at around 130-150° C. until bond is not tacky (e.g., 2-24 hours).
(5) Decrease the temperature, remove to ambient conditions, and remove from fixture.

EXAMPLE 3

Gold Bonding.
According to the procedure of example 2:
Group 1) Four gold-coated microscope slides are bonded to four gold-coated microscope slides.
Group 2) Four gold-coated microscope slides are bonded to four uncoated borofloat microscope slides.

Two sets of each group use the adhesive of example 1. Two sets of each group use Dow Corning 93-500™, a commercially available epoxy adhesive. The microscope slides are overlapped by ≈25 mm. Upon curing, all samples appear to be strongly bonded. Upon pulling and twisting the non-overlapped ends of the bonded microscope slide by hand, the slides bonded with the Dow Corning 93-500 epoxy come apart easily. The slides bonded using the adhesive of example 1 cannot be pulled apart.

EXAMPLE 4

Thermal Cycling.
According to example 3, a bonded set of gold-coated to gold-coated microscope slides using the adhesive of example 1, is thermal cycled 3 times from −60° C. to +60° C., each cycle taking approximately 24 hours. At the conclusion of the thermal cycling there is no delamination or other obvious effects to the bond.

EXAMPLE 5

Adhesion
According to example 4, after thermal cycling, the bonded set of gold-coated to gold-coated microscope slides are evaluated using an Instron force testing machine. The non-overlapping ends of the bonded microscope slides are cut off. The resulting 25×25 mm bonded sample is bonded to a non-movable fixture and a movable fixture using a dental bond adhesive. The movable fixture is pulled at a controlled rate (1 mm/min) from the non-movable fixture and the gold-coated microscope slide bonded sample does not break at the maximum applied force of 2000 newtons.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The preceding examples can be repeated with similar success by substituting the generically or specifically described reactants and/or operating conditions of this invention for those used in the preceding examples.

The invention claimed is:

1. A method of bonding a gold surface to a second surface comprising
heating to >50° C. a hybrid organic-inorganic melting gel prepared from a precursor of formula I $$R^1{}_m\text{—}Si(OR^2)_{4-m},\quad (I)$$

wherein m=0, 1, 2 or 3,
$R^1$ can be the same or different and is ethyl, methyl, n-propyl, isopropyl, n-butyl, t-butyl, n-hexyl, n-heptyl, n-octyl, isooctyl, benzyl, trimethylsilylmethyl, n-decyl, octadecyl, methylheptacosane, methyltricosane, cyclohexyl, dodecyl, n-hexadecyl, eicosyl, docosyl, cyclopentyl, tolyl, and/or phenyl,
and $R^2$ is methyl, ethyl, propyl,
applying said melting gel to either the gold surface or the second surface,
bringing the surfaces together, and
heating the melting gel to above 130° C. until the melting gel has cured sufficiently to bond the gold surface and said second surface together.

2. A method according to claim 1, wherein the gold surface is a gold-coated non-gold substrate.

3. A method according to claim 1, wherein the second surface is a gold or a gold-coated surface, a glass, fused silica, or a glass ceramic.

4. A method according to claim 1, wherein the hybrid organic-inorganic melting gel precursor is a methyltriethoxysilane (MTES)/dimethyldiethoxysilane (DMDES) sol-gel.

5. A method according to claim 1, wherein the melting gel is applied at 50°-110° C.

6. A method according to claim 1, wherein the melting gel is cured at 130°-180° C.

7. A method according to claim 1, wherein the melting gel is cured for about 5-1500 minutes.

8. A combination comprising:
a gold surface,
and a second surface
wherein said gold surface is bonded to said second surface with a hybrid organic-inorganic melting gel prepared from a precursor of formula I $$R^1{}_m\text{—}Si(OR^2)_{4-m},\quad (I)$$

wherein m=0, 1, 2 or 3,
$R^1$ can be the same or different and is ethyl, methyl, n-propyl, isopropyl, n-butyl, t-butyl, n-hexyl, n-heptyl, n-octyl, isooctyl, benzyl, trimethylsilylmethyl, n-decyl, octadecyl, methylheptacosane, methyltricosane, cyclohexyl, dodecyl, n-hexadecyl, eicosyl, docosyl, cyclopentyl, tolyl, and/or phenyl,
and $R^2$ is methyl, ethyl, propyl.

9. The combination according to claim 8, prepared by heating a hybrid organic-inorganic melting gel >50° C.,
applying said melting gel to either the gold surface or the second surface,
bringing the surfaces together, and
heating the melting gel to above 130° C. until the melting gel has cured sufficiently to bond the gold surface and said second surface together.

10. The combination according to claim 8, wherein said gold surface is a gold-coated non-gold substrate.

11. A combination according to claim 8, wherein the second surface is a gold or a gold-coated, a glass, fused silica, or a glass ceramic.

12. A combination according to claim 8, wherein the hybrid organic-inorganic melting gel precursor is a methyltriethoxysilane (MTES)/dimethyldiethoxysilane (DMDES) sol-gel.

13. A combination according to claim 11, wherein said gold-coated surface is a gold-coated low expansion glass ceramic.

14. A combination according to claim 13, wherein said gold-coated low expansion glass ceramic has a nickel, chrome, or titanium adhesion coating under the gold coating.

15. A combination according to claim 8, wherein said gold surface is a gold-coated borosilicate glass and said second surface is a borosilicate glass, fused silica or glass-ceramic.

16. A method of bonding a gold surface to a second surface comprising
heating to >50° C. a hybrid organic-inorganic melting gel prepared from a precursor of formula I $$R^1{}_m\text{—Si}(OR^2)_{4-m},\quad\quad (I)$$

wherein m=0, 1, 2 or 3,
$R^1$ can be the same or different and is ethyl, methyl, n-propyl, isopropyl, n-butyl, t-butyl, n-hexyl, n-heptyl, n-octyl, isooctyl, benzyl, trimethylsilylmethyl, n-decyl, octadecyl, methylheptacosane, methyltricosane, cyclohexyl, dodecyl, n-hexadecyl, eicosyl, docosyl, cyclopentyl, tolyl, and/or phenyl,
and $R^2$ is methyl, ethyl, propyl,
casting said melting gel as a film, sheet, block or lens,
curing or partially curing said cast melting gel,
applying said cured or partially cured cast melting gel to either the gold surface or the second surface,
optionally applying additional uncured melting gel,
bringing the surfaces together, and
heating the melting gel to above 130° C. until the melting gel has cured sufficiently to bond the gold surface and said second surface together.

17. A method according to claim 16, wherein additional uncured melting gel is applied to the cast melting gel prior to heating above 130° C.

18. A method according to claim 16, wherein said cast melting gel is from 5-10,000 microns thick.

19. A method according to claim 16, wherein said cast melting gel is partially cured and is from 5-1,000 microns thick.

20. A method of bonding a gold surface to a second surface comprising
heating to >50° C. a hybrid organic-inorganic melting gel prepared from a precursor of formula I $$R^1{}_m\text{—Si}(OR^2)_{4-m},\quad\quad (I)$$

wherein m=0, 1, 2 or 3,
$R^1$ can be the same or different and is ethyl, methyl, n-propyl, isopropyl, n-butyl, t-butyl, n-hexyl, n-heptyl, n-octyl, isooctyl, benzyl, trimethylsilylmethyl, n-decyl, octadecyl, methylheptacosane, methyltricosane, cyclohexyl, dodecyl, n-hexadecyl, eicosyl, docosyl, cyclopentyl, tolyl, and/or phenyl,
and $R^2$ is methyl, ethyl, propyl,
and adding a acid catalyst,
applying said melting gel to either the gold surface or the second surface,
bringing the surfaces together, and
heating the melting gel to above 60° C. until the melting gel has cured sufficiently to bond the gold surface and said second surface together.

* * * * *